E. E. JUCHTZER.
HAY BUNCHING MACHINE.
APPLICATION FILED JAN. 30, 1918.

1,381,420.

Patented June 14, 1921.
4 SHEETS—SHEET 1.

Inventor
Eugene E. Juchtzer
By Arthur L. Slee
Atty.

E. E. JUCHTZER.
HAY BUNCHING MACHINE.
APPLICATION FILED JAN. 30, 1918.
1,381,420.
Patented June 14, 1921.
4 SHEETS—SHEET 2.
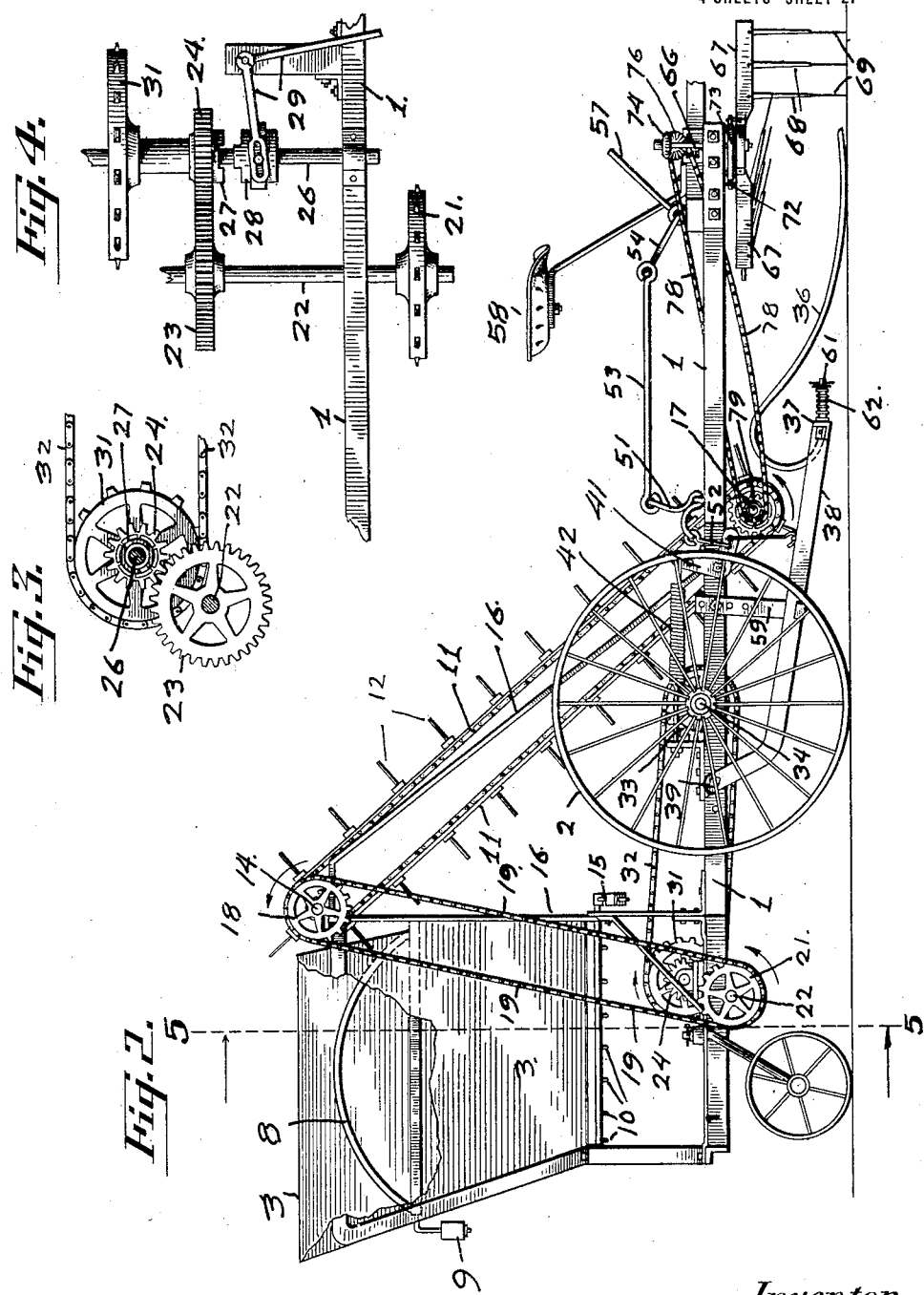
Inventor
Eugene E. Juchtzer
By Arthur L. Slee,
Atty.

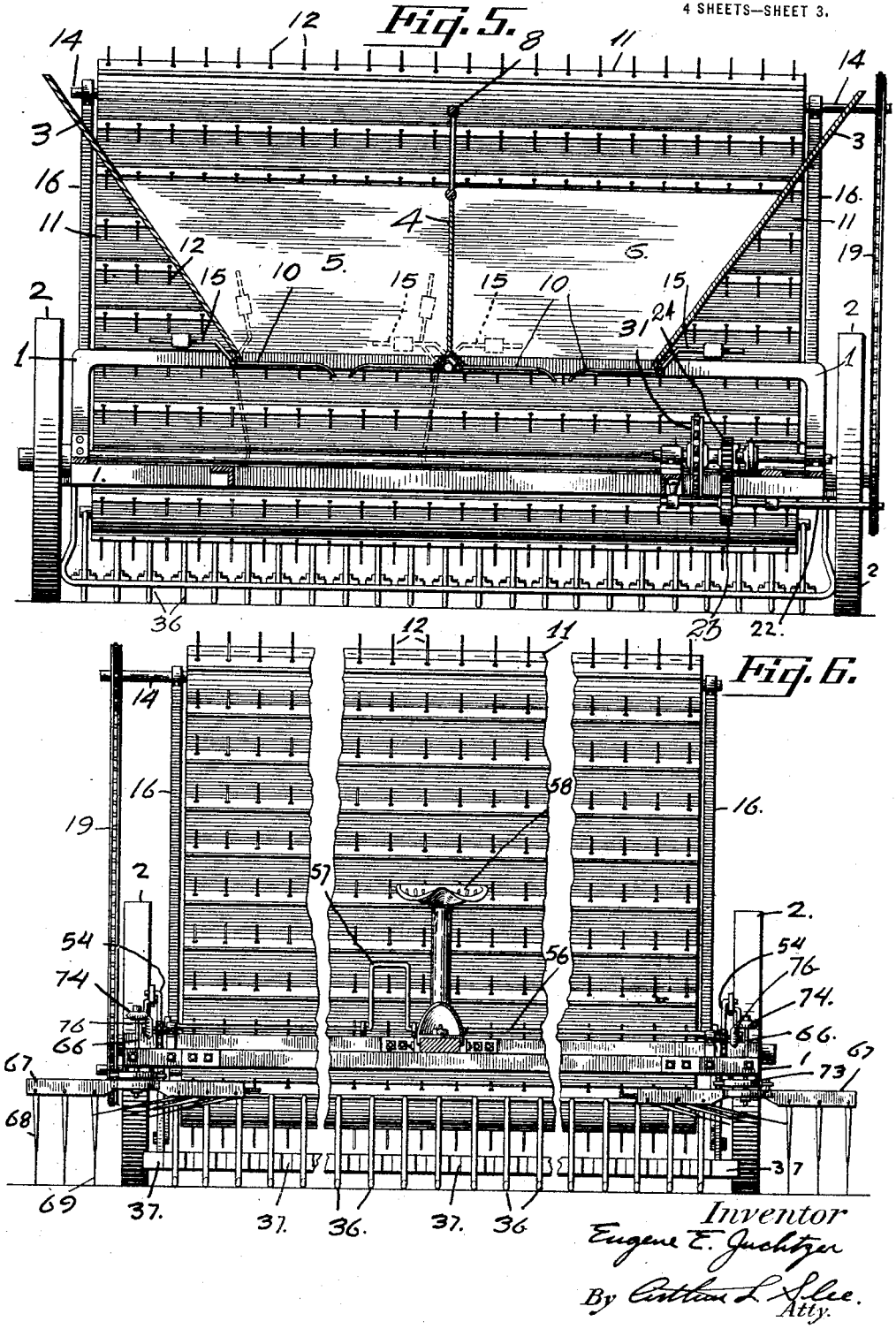

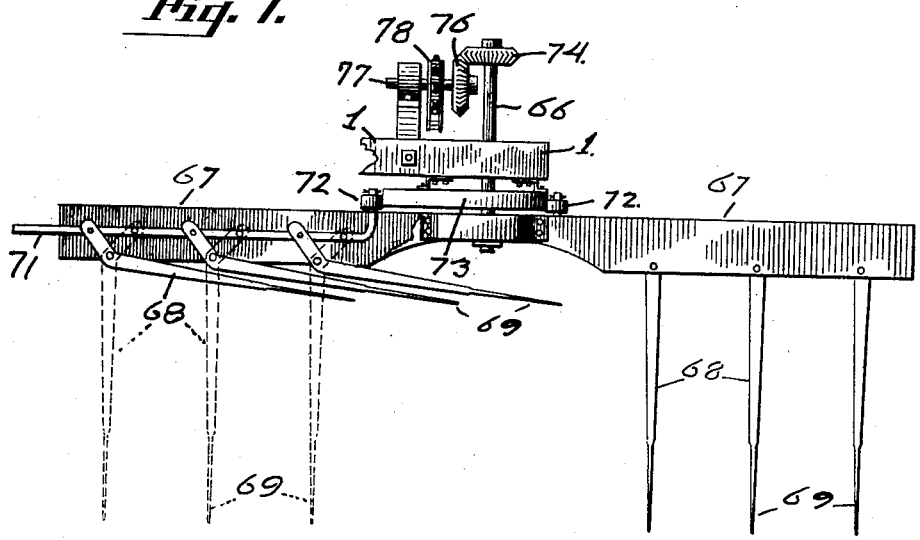
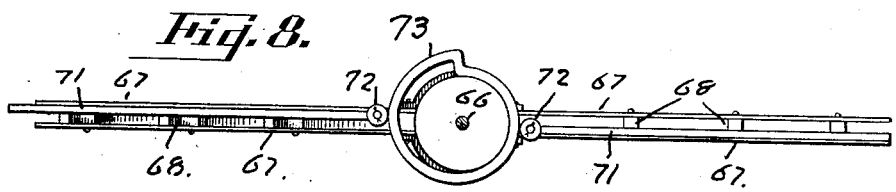
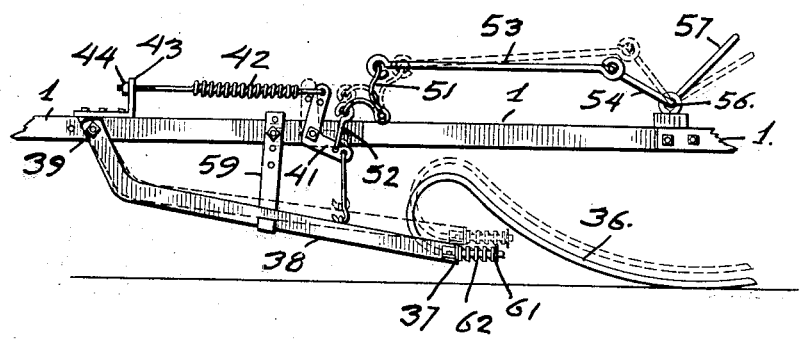

UNITED STATES PATENT OFFICE.

EUGENE E. JUCHTZER, OF SAN FRANCISCO, CALIFORNIA.

HAY-BUNCHING MACHINE.

1,381,420.  Specification of Letters Patent.  Patented June 14, 1921.

Application filed January 30, 1918. Serial No. 214,555.

*To all whom it may concern:*

Be it known that I, EUGENE E. JUCHTZER, a subject of the Emperor of Germany, residing in the city and county of San Francisco and State of California, have invented a new and useful Hay-Bunching Machine, of which the following is a specification.

My invention relates to hay bunching machines wherein a draper operates in conjunction with a downwardly converging hopper to gather and bunch hay; and has for its primary object to provide improved means for gathering or harvesting cut hay and the like and gather said hay into amassed bunches to facilitate in the work of loading the hay onto wagons for transportation from the field.

It is a further object of the invention to slightly compress or amass the hay into a comparatively small compass so that the greatest possible amount may be lifted with one hay fork while loading onto hay wagons.

It is still a further object of the present invention to provide improved means for bunching hay in bunches of substantially equal quantity.

A further object of my invention is to provide improved means for gathering hay from a path of greater width than the machine.

I accomplish these several features by means of the device disclosed in the drawings forming a part of the present specification wherein like characters are used to designate similar parts throughout the said specification and drawings, and in which—

Fig. 2 is a broken side elevation of Fig. 1;

Fig. 3 is an enlarged detailed view of a portion of the driving mechanism;

Fig. 4 is a plan view of the driving mechanism;

Fig. 5 is a vertical sectional view taken on line 5—5 of Fig. 2 in the direction indicated;

Fig. 6 is a broken front elevation;

Fig. 7 is an enlarged broken detailed view of the rotating rake shown on the lower right hand corner of Fig. 6;

Fig. 8 is a plan view of Fig. 7; and

Fig. 9 is a broken detailed view disclosing the hay gathering mechanism and the adjusting means therefor.

Figure 1:
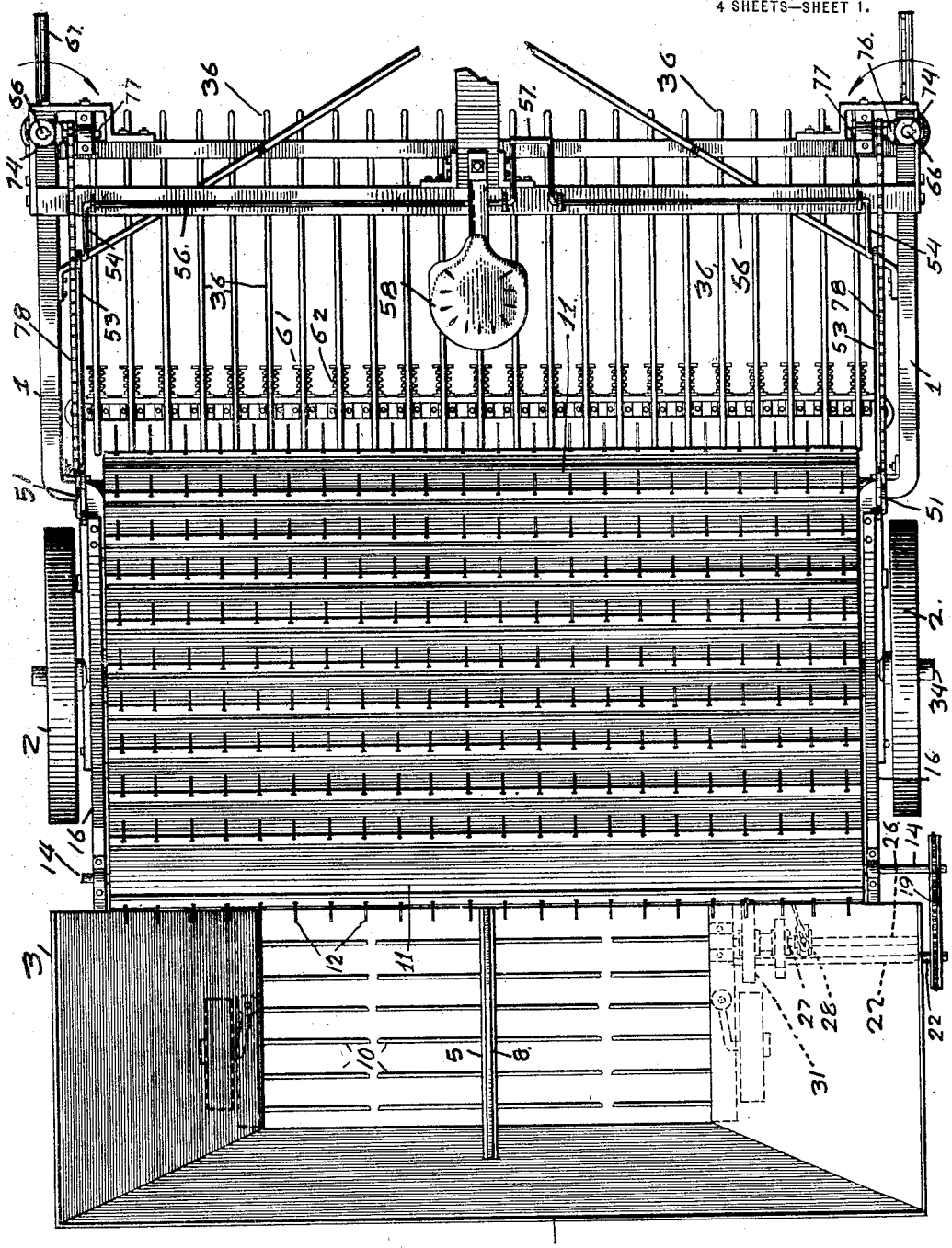
Figure 1 is a plan view of my improved machine.

Referring to the drawings the numeral 1 is used to designate in general a suitable frame mounted upon tractor wheels 2. A downwardly converging hopper 3 is mounted upon the rear of the frame 1 and is provided with a centrally disposed vertical partition 4 to divide the hopper 3 into two compartments 5 and 6.

An arcuate rod 8 is pivotally mounted upon the top of the partition 4 and is normally retained in a vertically disposed position by means of a weight 9 as disclosed in Fig. 2 of the drawings, the purpose of which will hereinafter be more fully described.

A series of retaining fingers 10 are pivotally mounted on the lower ends of the hopper 3 and the compartments 5 and 6 therein to normally prevent the passage of hay from said hopper 3.

These fingers 10 are normally held in a substantially horizontal position as disclosed in Fig. 5 of the drawings, by means of weighted arms 15. The arms 15 operate to retain the fingers 10 in a position to prevent the passage of hay from the hopper 3 and the compartments 5 and 6 therein until the weight of the accumulated hay is in excess of the resistance offered by the weighted fingers 10.

An inclined draper 11, provided with a series of projecting fingers 12, has its upper end mounted over the forward end of the hopper 3 and on a shaft 14 rotatably mounted upon a superstructure 16 in turn mounted upon the frame 1. The lower end of the draper 11 is mounted upon a shaft 17 in turn rotatably mounted under the forward portion of the frame 1.

The shaft 14 is provided with a sprocket 18 driven by a chain 19 and sprocket 21 on a counter shaft 22, which shaft 22 is provided with a gear 23 meshing with a gear 24, loosely mounted upon a second counter shaft 26, and provided with a clutch member 27 arranged to engage a similar clutch member 28 feathered to the counter shaft 26. The counter shaft 26 is also provided with a sprocket 31 which is driven by a chain 32 in turn driven by a sprocket 33 on the shaft 34 which carries the traction wheels 2.

The clutch member 28 may be shifted to engage or disengage the clutch member 27 of the gear 24 by means of the lever 29 as disclosed in Fig. 4 of the drawings.

Extending forwardly from the front or lower end of the draper 11 are a series of longitudinally disposed spring fingers 36 having their rear ends slidably mounted within a transverse bar 37 mounted upon the front ends of two longitudinal levers 38 whose rear ends are pivotally mounted upon the frame 1 as at 39.

A bell crank lever 41 is pivotally mounted upon each side of the frame 1 above the levers 38 and has one end operatively connected to said levers 38 while the other end or arm of each bell crank lever 41 is connected to a spring 42 provided with a threaded end secured to a bracket 43 upon each side of the frame 1. A nut 44, mounted upon each threaded end of each spring 42 operates to regulate the tension of the spring to a degree nearly equal to the combined weight of the arms 38, bar 37 and fingers 36 so that said members or elements may be easily raised or lowered by the following described mechanism.

A second bell crank lever 51 is pivotally mounted upon each side of the frame 1 and adjacent to the bell crank lever 41 and has one arm operatively connected to said bell crank lever 41 by means of a suitable connecting rod 52. The other arm of each bell crank lever 51 is operatively connected, by means of a suitable connecting rod 53, to an arm or lateral extension 54 on a transversely disposed rod 56 rotatably mounted upon the front bar of the frame 1, said rod 56 having a lateral extension 57 arranged therein adjacent the driver's seat 58, so that said extension 57 may be operated by the driver's foot to raise and lower the arms 38, bar 37 and the fingers 36 to clear obstructions on the field or enter unusual depressions and gather hay therefrom.

A pair of brackets 59 are secured, one on each side of the frame 1, to normally support the arms 38 and also for the purpose of limiting their downward movement.

The spring fingers 36, being slidably mounted within the front bar 37, are provided with collars 61 and a spring 62 is interposed between each collar 61 and the front bar 37 to provide a resilient resistance to each finger 36 so that when said fingers suddenly encounter an obstruction the blow or shock will be partially absorbed by the springs 62.

In order to gather hay from a path greater in width than the extreme width of the fingers 38 and also for the purpose of increasing the capacity of the machine without increasing its width I have provided the wing rakes which may be described as follows:

A vertically disposed shaft 66 is rotatably mounted upon each forward corner of the frame 1 as disclosed in Figs. 1 and 6 of the drawings. To the lower end of each shaft 66 I have secured parallel bars 67 and between each pair of bars 67 are pivotally suspended a series of tines 68 having reduced resilient lower ends 69.

The upper ends of the tines 68 are pivotally connected to a connecting rod 71, there being two rods 71, one on each side of the shaft 66. The inner end of each rod 71 is provided with an upturned extension having a roller 72 thereon which is actuated by means of a cam 73 so arranged as to incline the tines 68 and move the lower ends 69 thereof upward and inward toward the shafts 66 when each respective set of tines 68 has delivered its load of gathered hay within the range of the fingers 36, the bars 67 rotating in the direction indicated by the curved arrows in Fig. 1 of the drawings.

The cam also operates to release the tines 68 and thereby permit them to be lowered suddenly by the action of gravity after they have cleared the fingers 36 thereby permitting said tines 68 to gather hay from beyond the sides of and onto the said fingers 36 as the machine moves forward.

The bars 67 are rotated by means of the shafts 66 which are provided with bevel gears 74 meshing with similar gears 76 upon counter shafts 77 rotatably mounted on each forward corner of the frame 1. The counter shafts 77 are in turn rotated by means of chains 78 connected to sprockets 79 on the forward or lower shaft 17 of the inclined draper 11.

The operation is as follows:

As the machine moves forward the rakes containing the tines 68 are rotated in the direction indicated and gather hay from beyond the sides of the machine onto the fingers 36. The fingers 36 in turn gather hay in their path and the forward movement of the machine causes said hay to be amassed at the rear ends of said fingers 36 and adjacent the lower end of the draper 11.

As the draper 11 is operated, by means of the chain 32, sprockets 31, gears 23 and 24, sprockets 21 and 18 connected by the chain 19, and drive shaft 14, the projecting fingers 12 on said draper 11 carry portions of the amassed hay from the rear of the fingers 36 upward and into the hopper 3, a portion necessarily falling upon the arcuate bar 8 pivotally mounted upon the top of the partition 4.

When the weight of the accumulated hay on the top of the bar 8 exceeds in weight the weight of the weight 9 the said arcuate bar 8 is turned toward that side having a preponderance of weight and the accumulated hay is precipitated into the hopper on one side of the partition 4.

As the hay is conveyed into the downwardly converging hopper 3 it is evident that the action of gravity, assisted by the vibration of the machine in passing over the ground, will tend to force the hay downward and amass said hay.

When the weight of the amassed hay in either compartment 5 or 6 is greater than the resistance offered by the weighted fingers 10, said fingers are moved downward as disclosed in dotted lines in Fig. 5 of the drawings to discharge the amassed hay in a bunch from the compartment. As soon as a quantity of hay has been thus discharged the fingers 10 are automatically moved, by the weighted arms 15, to close the bottoms of the compartments 5 or 6, whichever one has been discharged, to again accumulate and amass hay delivered into said compartment by the action of the inclined draper 11 and the arcuate bar 8.

It is obvious from the foregoing that I have provided an improved hay bunching machine wherein the hay is amassed and arranged in bunches, as well as improved means for gathering hay from a path greater in width than the entire width of the machine.

Having thus described my invention what I claim as new and desire to secure by Letters Patent is—

1. A hay bunching machine comprising a hopper; means for conveying hay from the ground to the hopper; a partition dividing said hopper into two substantially equal compartments; retaining means operatively mounted adjacent the bottoms of said hopper compartments for retaining hay therein, and adapted to release said hay when a predetermined amount has been deposited in said compartments.

2. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein.

3. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein; means for directing hay retained upon the partition into one of the compartments.

4. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein; and a bar pivotally mounted above the partition for directing hay retained thereon into one of the compartments.

5. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein; and a bar pivotally mounted above the partition and in the plane of the top thereof for directing hay retained thereon into one of the compartments.

6. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein; and an arcuate bar pivotally mounted above and in the plane of the partition for directing hay retained thereon into one of the compartments.

7. A hay bunching machine comprising a hopper; a partition dividing said hopper into two substantially equal compartments; means for conveying hay from the ground to the hopper; retaining means operatively mounted adjacent the bottoms of said hopper compartments for retaining hay therein and adapted for releasing said hay from either compartment independently when a predetermined amount has been deposited therein; an arcuate bar pivotally mounted above and in the plane of the partition; and weights operatively connected with the arcuate bar for normally maintaining said bar in an upright position until the weight of hay retained thereon is in excess of said weights.

In witness whereof I hereunto set my signature.

EUGENE E. JUCHTZER.